United States Patent
Schatz et al.

(10) Patent No.: US 7,729,620 B2
(45) Date of Patent: Jun. 1, 2010

(54) METHODS AND SYSTEMS FOR CONTROLLING OPTICAL POWER ATTENUATION

(75) Inventors: Paul Schatz, Burnsville, MN (US); Dean Zavadsky, Shakopee, MN (US); William J. Mitchell, Eden Prairie, MN (US); Steve Stuart, Eden Prairie, MN (US); Ana Santos, Minneapolis, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 1266 days.

(21) Appl. No.: 11/238,553

(22) Filed: Sep. 29, 2005

(65) Prior Publication Data

US 2007/0071451 A1    Mar. 29, 2007

(51) Int. Cl.
*H04B 10/08* (2006.01)
*H04B 17/00* (2006.01)
*H04B 10/06* (2006.01)

(52) U.S. Cl. .................. 398/160; 398/37; 398/177; 398/209

(58) Field of Classification Search .............. 398/37, 398/38, 160, 162, 208, 209, 210
See application file for complete search history.

(56) References Cited

U.S. PATENT DOCUMENTS

| | | | |
|---|---|---|---|
| 4,183,054 A | 1/1980 | Patisaul et al. | |
| 4,611,323 A | 9/1986 | Hessenmiiller | |
| 4,628,501 A | 12/1986 | Loscoe | |
| 4,654,843 A | 3/1987 | Roza et al. | |
| 4,691,292 A | 9/1987 | Rothweiler | |
| 4,999,831 A | 3/1991 | Grace | |
| 5,019,769 A | 5/1991 | Levinson | |
| 5,193,109 A | 3/1993 | Chien-Yeh Lee | |

(Continued)

FOREIGN PATENT DOCUMENTS

EP    0391597    10/1990

(Continued)

OTHER PUBLICATIONS

Harvey et al., "Cordless Communications Utilising Radio Over Fibre Techniques for the Local Loop", "IEEE International Conference on Communications", Jun. 1991, pp. 1171-1175, Publisher: IEEE.

(Continued)

*Primary Examiner*—Nathan M Curs
(74) *Attorney, Agent, or Firm*—Fogg & Powers LLC (57) ABSTRACT

Methods and systems for controlling optical power attenuation are provided. A method comprises periodically measuring an optical power of an optical signal received by an optical receiver and periodically measuring a first attenuation control signal voltage. When the optical power measurement is outside a target power range, the method continues with calculating a target voltage necessary to maintain the optical power measurements at a target power level; calculating a second attenuation control signal based on the target voltage, wherein the second attenuation control signal is calculated to provide an over-damped transient response that maintains the second attenuation control signal within a usable range of a variable optical power attenuator; applying a second attenuation control signal voltage based on the second attenuation control signal to the variable optical power attenuator; and adjusting attenuation of the optical signal based on the second attenuation control signal voltage.

31 Claims, 5 Drawing Sheets

U.S. PATENT DOCUMENTS

| | | |
|---|---|---|
| 5,243,598 A | 9/1993 | Lee |
| 5,321,849 A | 6/1994 | Lemson |
| 5,339,184 A | 8/1994 | Tang |
| 5,923,450 A | 7/1999 | Dugan et al. |
| 6,061,171 A | 5/2000 | Taylor et al. |
| 6,567,762 B2 | 5/2003 | Bourde et al. |
| 6,600,594 B1 | 7/2003 | Ko et al. |
| 6,941,079 B1 * | 9/2005 | Barozzi et al. ............. 398/157 |
| 7,343,102 B2 * | 3/2008 | Tomofuji et al. ............ 398/160 |
| 2001/0019102 A1 | 9/2001 | Chikuma |
| 2003/0081301 A1 | 5/2003 | Fujii et al. |
| 2004/0062557 A1 | 4/2004 | Takashima et al. |
| 2004/0081421 A1 | 4/2004 | Mori et al. |
| 2004/0109661 A1 * | 6/2004 | Bierman et al. ............. 385/140 |
| 2005/0019032 A1 | 1/2005 | Scarth et al. |

FOREIGN PATENT DOCUMENTS

| | | |
|---|---|---|
| EP | 0502386 | 9/1992 |
| JP | 2000049712 | 2/2000 |
| WO | 9115927 | 10/1991 |
| WO | 2004051891 | 6/2004 |

OTHER PUBLICATIONS

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

Harvey et al., "Cordless Communications Utilising Radio Over Fibre Techniques for the Local Loop", "IEEE International Conference on Communications", , pp. 1171-1175, Publisher: IEEE, 1991.

* cited by examiner

METHODS AND SYSTEMS FOR CONTROLLING OPTICAL POWER ATTENUATION

CROSS REFERENCES TO RELATED APPLICATIONS

This application is related to the following co-pending United States patent applications filed on even date herewith, all of which are hereby incorporated herein by reference:

U.S. patent application Ser. No. 11/238,364 entitled "Systems and Methods for Optical Power Window Control") and which is referred to here as the '705 application.

TECHNICAL FIELD

The present invention generally relates to voice and data communications networks and more specifically to optical power feedback based attenuation in optical communications networks.

BACKGROUND

One of the major challenges of installing and operating optical data communications systems, such as those often used to communicate data within cellular networks, is maintaining optical power levels within the power windows required for optical receivers to correctly function. One way the communications industry has handled this requirement is by installing fixed inline optical power attenuators in the physical layer of an optical communications system. However, problems arise in this solution because every network facility is different in terms of optical power loss due to equipment and varying fiber optic cable lengths. To implement the fixed optical power attenuator solution, network operators must deploy technicians to manually take optical power measurements at one location while calibrating attenuators at other locations. Besides the high implementation and operational expenses associated with fixed inline attenuators, their presence in the physical layer of a communications network create additional points for introducing contamination and network failures.

For the reasons stated above and for other reasons stated below which will become apparent to those skilled in the art upon reading and understanding the specification, there is a need in the art for improved methods and systems for optical power window control.

SUMMARY

The Embodiments of the present invention provide methods and systems for optical power window control and will be understood by reading and studying the following specification.

In one embodiment, a method for controlling optical power in an optical communications network is provided. The method comprises periodically measuring an optical power of an optical signal received by an optical receiver and periodically measuring a first attenuation control signal voltage. When the optical power measurement is outside a target power range, the method further comprises calculating a target voltage necessary to maintain the optical power measurements at a target power level; calculating a second attenuation control signal based on the target voltage, wherein the second attenuation control signal is calculated to provide an over-damped transient response that maintains the second attenuation control signal within a usable range of a variable optical power attenuator; applying the second attenuation control signal voltage based on the second attenuation control signal to the variable optical power attenuator; and adjusting attenuation of the optical signal based on the second attenuation control signal voltage.

In another embodiment, a computer-readable medium having computer-executable program instructions for a method for controlling optical power in an optical communications network is provided. The method comprises periodically measuring an optical power of an optical signal received by an optical receiver and periodically measuring a first attenuation control signal voltage. When the optical power measurement is outside a target power range the method further comprises calculating a target voltage necessary to maintain the optical power measurements at a target power level; calculating a second attenuation control signal based on the target voltage, wherein the second attenuation control signal is calculated to provide an over-damped transient response that maintains the second attenuation control signal within a usable range of a variable optical power attenuator; applying a second attenuation control signal voltage based on the second attenuation control signal to the variable optical power attenuator; and adjusting attenuation of the optical signal based on the second attenuation control signal voltage.

In yet another embodiment, a feedback system for controlling optical power levels is provided. The system comprises an optical receiver that receives a modulated optical light signal, demodulates the modulated optical light signal into one or more communications signals, and outputs the one or more communications signals to a communications network, wherein the optical receiver further measures an optical power level of the received optical light signal and outputs a power level signal representing the optical power level. The system further comprises at least one optical power attenuator that dynamically adjusts the attenuation of the modulated optical light signal based on a control signal; and a controller coupled to the optical receiver, wherein the controller receives the power level signal from the optical receiver, wherein when the optical power level is outside a target power range, the controller calculates a target voltage necessary to maintain the optical power level at a target power level and outputs the control signal based on the target voltage, wherein the control signal is calculated to provide an over-damped transient response that maintains the control signal within a usable range of the optical power attenuator.

DRAWINGS

The present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention allow a communications network to automatically attenuate an optical signal to prevent damage to a receiver while still maintaining adequate optical power to reliably demodulate the optical signal. Embodiments of the present invention provide optical power attenuation control through a feedback controlled optical power attenuation system. Embodiments of the present invention further provide automated set-up and control of optical power in communication networks, thus reducing installation and long term operating expenses for network operators, and eliminating the need to send technicians to remote locations to perform inline attenuator calibrations. Additionally, embodiments of the present invention provide enhanced effective optical signal receive power due to threshold maximization, enhanced alarming accuracy, and customization of the optical receive power window.

Figure 1:
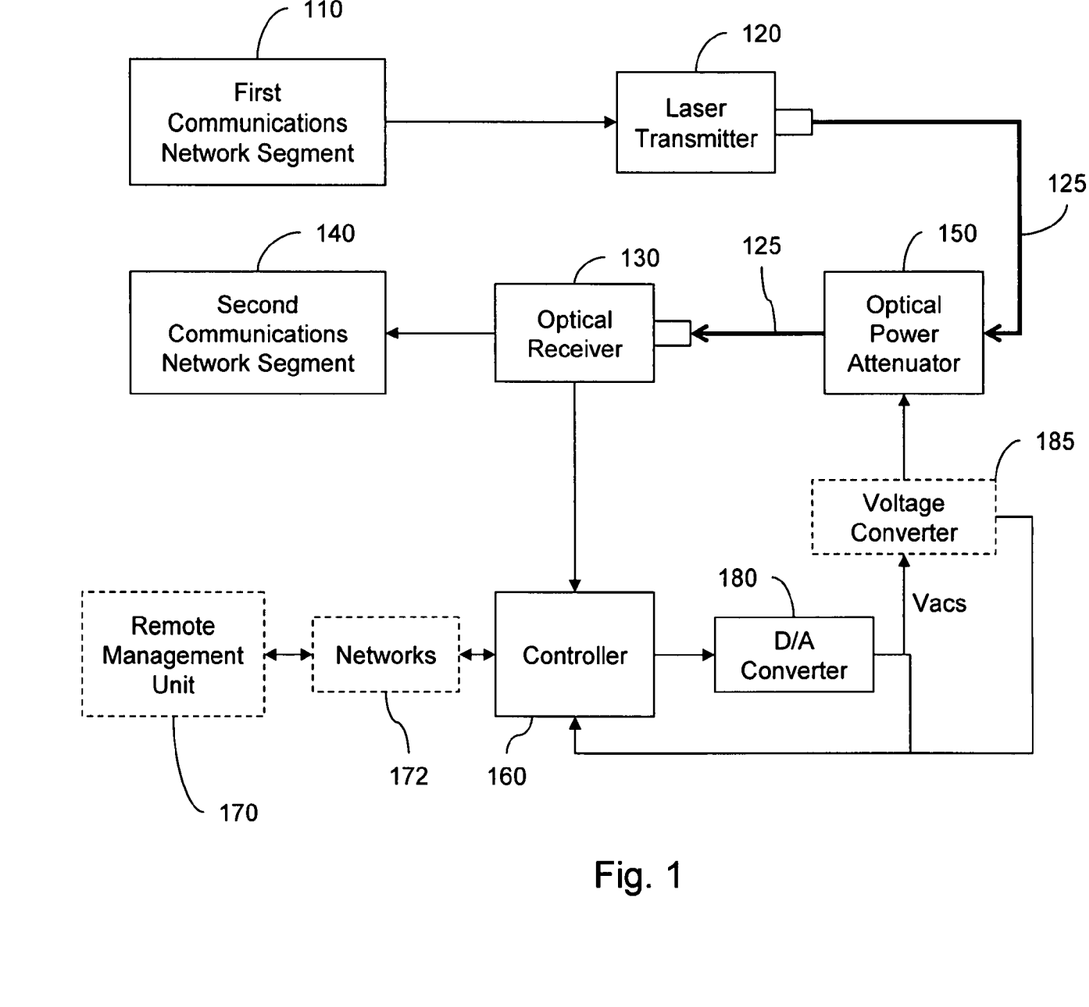
FIG. 1 is a diagram illustrating a communications network having received optical power feedback based attenuation of one embodiment of the present invention.

FIG. 1 illustrates a telecommunications network 100 of one embodiment of the present invention where baseband communication signals are transmitted from a first communications network segment 110 to a second communications network segment 140 via a fiber optic link. In one embodiment, first communications network segment 110 comprises a cellular remote unit that receives wireless radio frequency communications signals and modulates the signals to a baseband frequency. In one embodiment, first communications network segment 110 further converts the signals from analog to digital. In one embodiment, second communications network segment 140 comprises a cellular remote unit that receives baseband communications signals, re-modulates the signals to a radio channel, and wirelessly transmits the signals as radio frequency communications signals. In one embodiment, second communications network segment 140 further converts the signals from digital to analog.

In one embodiment, first communications network segment 110 outputs baseband communication signals to a laser transmitter 120 that modulates laser light based on the baseband communication signals, and transmits the modulated laser light to optical receiver 130 via one or more fiber optic media 125. In one embodiment, the baseband communications signals are analog signals. In one embodiment, the baseband communications signals are digital signals. Fiber optical media 125 is one or more of single wavelength, multiple wavelength and bidirectional wavelength. Optical receiver 130 demodulates the laser light back into a baseband signal and outputs that baseband signal to second communications network segment 140. In one embodiment, the baseband signal is an analog signal. In one embodiment, the baseband signal is a digital signal. Optical receiver 130 has very specific window of operation for receiving optical signals, and too much power will damage optical receiver 130. Due to differences in manufacturer's specifications, there is no guarantee that the power of the optical signal launched by laser transmitter 120 will be within the window of operation when the signal reaches optical receiver 130. For example, in one embodiment, laser transmitter 120 launches a modulated optical light signal having an optical power of 0 dBm while optical receiver 130 requires received optical light signals to fall within a window of operation between −11 dBm to −27 dBm. The modulated optical light signal must be attenuated at least 11 dBm to prevent damage to optical receiver 130, but attenuated no more than 27 dBm to ensure that optical receiver can reliably demodulate the signal to recover the baseband communications signals without increasing the bit error rate.

To regulate the power of the optical signals in network 100, embodiments of the present invention comprise the inclusion of a feedback system in the form of a feedback controlled variable optical power attenuator 150, coupled between laser transmitter 120 and optical receiver 130, and a controller 160 coupled to optical receiver 130 and optical power attenuator 150. In one embodiment, controller 160 is a programmable controller programmed to maintain the optical power level of the signal received by optical receiver 130 within upper and lower power thresholds. Further details pertaining to network 100 are provided in the '705 application herein incorporated by reference.

In one embodiment, in operation, optical receiver 130 measures the optical power level of an optical signal it receives and outputs a digital signal representing the optical power level. Controller 160 receives the digital optical power level signal, and based on the optical power level of the optical signal, controller 160 outputs an attenuation control signal. Optical power attenuator 150 adjusts the attenuation of the optical signal launched by laser transmitter 120 to maintain the optical power level of the optical signal received by optical receiver 130 within the window of operation. In one embodiment, the attenuation control signal output from controller 160 is an analog voltage (Vacs) transmitted directly to optical power attenuator 150. In one embodiment, the attenuation control signal output from controller 160 is a digital signal converted into Vacs by digital to analog (D/A) converter 180 for input by optical power attenuator 150. Because the input and output voltage ranges for the respective optical power attenuator 150 and D/A converter 180 may not match, in one embodiment, network 100 further comprises one or more voltage converters 185. For example, in one embodiment, where D/A converter 180 outputs Vdc based on a 0-3 volt scale and optical power attenuator 150 requires a 12 to 20 volt scale input, voltage converter 185 rescales Vacs from the 0-3V scale to the 12-20V scale. Regardless of what voltage scaling is performed on Vacs, the analog voltage applied to optical power attenuator 150 remains an analog translation of the attenuation control signal generated by controller 160.

Figure 3:
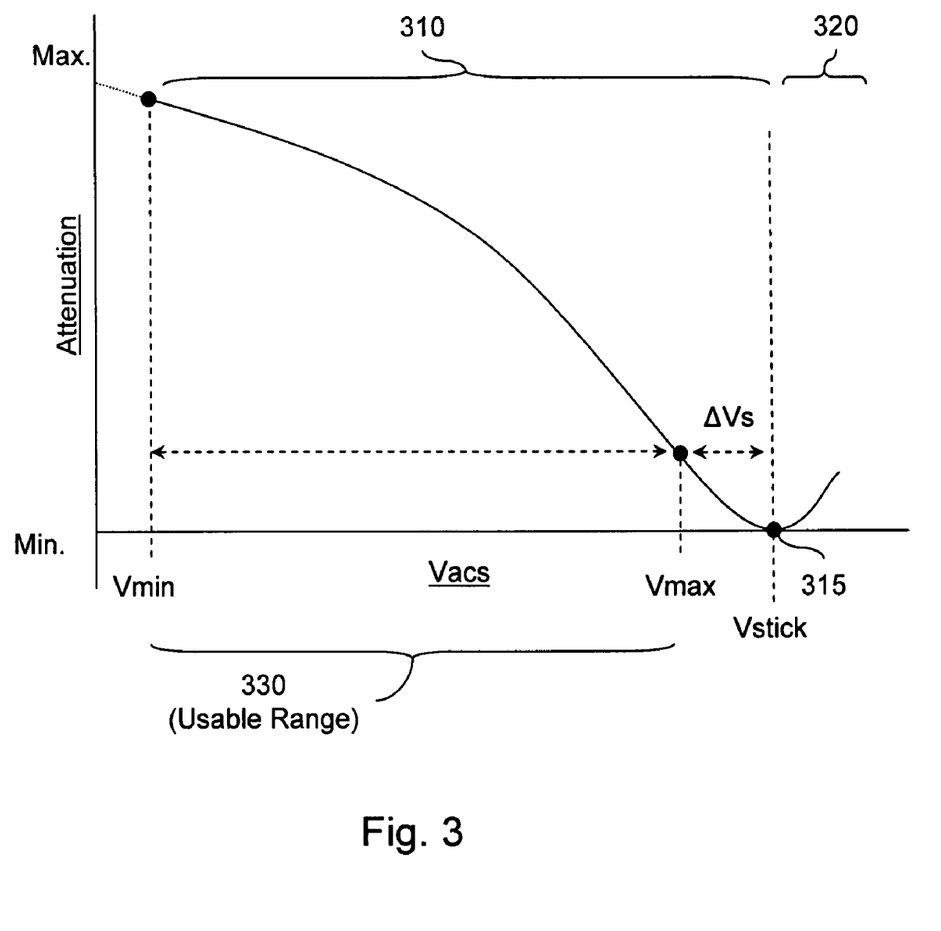
FIG. 3 is a diagram illustrating a characteristic voltage versus attenuation curve for an optical power attenuator of one embodiment of the present invention.

In order to correctly generate the attenuation control signal, controller 160 must be calibrated to establish the usable range for Vacs and the correlation between Vacs and the attenuation level provided by optical power attenuator 150. FIG. 3 illustrates a characteristic curve 300 that correlates signal attenuation by optical power attenuator 150 with Vacs for one embodiment of the present invention. For a significant range of the curve (shown at 310), as Vacs increases, the attenuation provided by optical power attenuator 150 approaches minimum attenuation. However, it is a very common characteristic of optical power attenuators that once minimum attenuation is obtained (shown at 315), additional increase in Vacs result in an undesirable increase in attenuation (shown as undesirable area 320). During network operation, maintaining optical attenuation near minimum indicates that optical power levels are potentially low enough to cause increases in bit error rates. When such conditions exist, any inadvertent increase in attenuation caused by entering undesirable area 320 has a high likelihood of destroying the communications link between first communications network segment 110 and second communications network segment 140.

Figure 2:
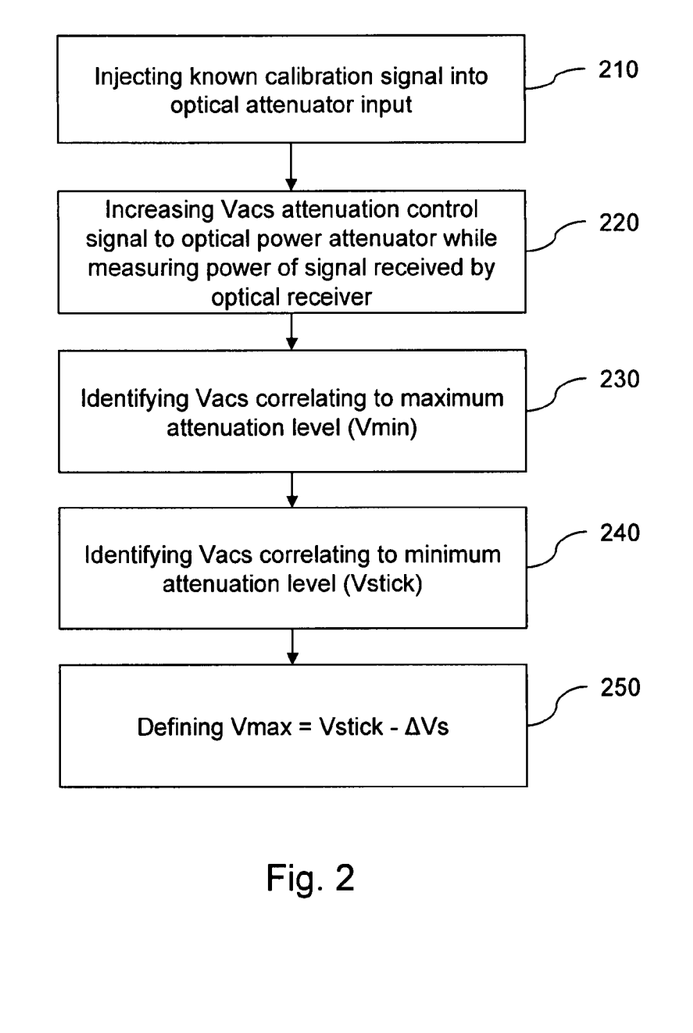
FIG. 2 is a flow chart illustrating a method of one embodiment of the present invention.

In order to avoid operation of optical power attenuator 150 in the undesirable area 320, embodiments of the present invention establish a usable range 330 of Vacs as illustrated by method 200 in FIG. 2. Method 200 begins at 210 and comprises injecting a known calibration signal into the optical input of optical power attenuator 150. In one embodiment the power level of the known calibration signal is equal to the desired input power level during network operation. For example, where network operator desire receiving optical power signals with a power level of −17 dBm, then the optical power level of the calibration signal should be set to −17 dBm. This ensures that the feedback system is calibrated to be most accurate in the power area where the network will be actually operating. The method proceeds to 220 and varies the voltage Vacs applied to optical power attenuator 150 while measuring the corresponding changes in optical power received by optical receiver 130. Method 200 further comprises identifying the Vacs voltage level that correlates with the maximum signal attenuation point and defining that voltage level as Vmin (230). Vmin establishes the lower voltage limit of usable range 330. Typically, Vmin is determined by the lowest Vacs voltage that either D/A converter 180 or voltage converter 185 can generate. Method 200 further comprises identifying the Vacs voltage level that correlates with the minimum signal attenuation point (shown at 315) and defining that voltage level as Vstick (240). Vstick represents the Vacs voltage level that correlates with the transition into the undesirable area 320 of curve 300, where further increases in Vacs result in increased attenuation.

In order to create a safety buffer to prevent driving optical power attenuator 150 operation into undesirable area 320, Vmax, the upper voltage limit of usable range 330, is defined as a voltage ΔVs less than Vstick. ΔVs is a value chosen by network operators based on their experience with optical power oscillations and transients within their network. In one embodiment, where optical power attenuator 150 operates with an input voltage range of 11-20 volts, a ΔVs in the range of 0.4 volts would be an expected value.

Figure 4:
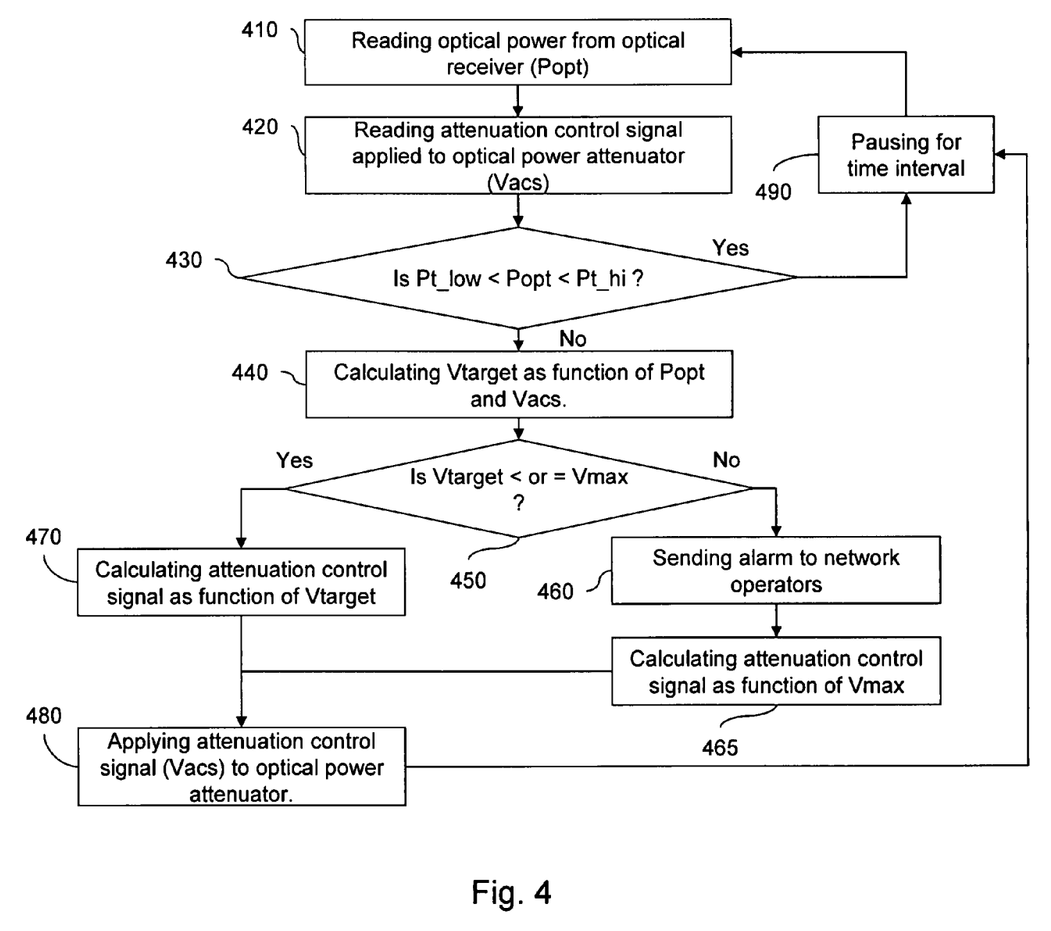
FIG. 4 is a flow chart illustrating a method of one embodiment of the present invention.

FIG. 4 illustrates a method 400 of one embodiment for an optical power control algorithm implemented by a controller of one embodiment of the present invention. Method 400 begins at 410 with reading an optical power level (Popt) from an optical receiver. In one embodiment, an optical receiver measures the optical power level of an optical signal it receives and outputs the measurement as digital optical power signal. Method 400 proceeds to 420 with reading an attenuation control signal applied to an optical power attenuator. In one embodiment, the attenuation control signal is an analog voltage (Vacs) output from one of the controller, a D/A converter, or a voltage converter. Method 400 proceeds to 430 and determines whether Popt lies between a lower power target setpoint (Pt_low) and an upper power target setpoint (Pt_hi). If so, then method 400 returns to 410 without adjusting the attenuation control signal. Pt_low and Pt_hi power target setpoints are power levels that fall within the window of operation for the optical receiver. Pt_low and Pt_hi power target setpoints define a target power range for normal network operation that envelopes a target optical power level (Pt) determined by network operators. For example, in one embodiment where the window of operation for an optical receiver is −11 dBm to −27 dBm and network operators have chosen a Pt of −17 dBm, then a Pt_low of −16.5 dBm and a Pt_high of −17.5 dBm are typical setpoints defining the target power range.

When Popt does falls within the target power range, method 400 proceeds to 490 and pauses for a time interval before resuming at 410. As illustrated by FIG. 4, reading optical power (410) and reading an attenuation control signal (420) are performed periodically with a periodicity that is a function of the pause at 490. As would be appreciated by one skilled in the art upon reading this specification, the time interval is readily determined by network operators based on the characteristics of their network and the desired transient response. In one embodiment, the time interval is 5 milliseconds.

When Popt does not fall within the target power range, then adjustment of the attenuation control signal is required and method 400 proceeds to 440 and calculates Vtarget. In one embodiment, Vtarget is calculated as a function of Popt and Vacs and represents the Vacs voltage theoretically required to drive the optical power attenuator to achieve an optical power level of Pt.

Method 400 next proceeds to 450 and determines whether Vtarget is less than or equal to Vmax. When Vtarget is greater than Vmax, the attenuation required to maintain Popt within Pt_low and Pt_hi cannot be achieved within the usable range 330 of curve 300. In that case, method 400 proceeds to 460 and sends an alarm to network operators. The alarm notifies network operators that Popt cannot be maintained within the target power range, possibly due to a change or degradation in the physical layer of the network, or an erroneous setpoint change.

Method 400 next generates the necessary attenuation control signal for communication to the optical power attenuator. When Vtarget is less than Vmax, method 400 proceed from 450 to 470 and calculates an attenuation control signal that produces a Vacs within usable range 330 as a function of Vtarget. When Vtarget is greater than Vmax, method 400 proceeds from 460 to 465 and calculates an attenuation control signal that produces a Vacs within usable range 330 as a function of Vmax (i.e. Vtarget is reset to equal Vmax). Method 400 next proceeds to 480 and applies Vacs to the optical power attenuator. After pausing for the time interval (490), method 400 continues the periodic reading of optical power and the attenuation control signal by resuming with 410.

Because avoiding operation in range area 320 of curve 300 is important, embodiments of the present invention further ensure that transient responses resulting from attenuation control signal feedback is always overdamped. Adequately high damping ensures stable, non-oscillating transient responses and avoids excessive overshoot. To achieve an overdamped transient response, embodiments of the present invention calculate an attenuation control signal which produces new Vacs's that asymptotically approach Vtarget. In one embodiment the attenuation control signal is based on a percentage of Vtarget, where the percentage depends on the difference between the current Vacs applied to optical power attenuator 150 and Vtarget. For example, in one embodiment assuming a Vmax of 20 volts and Vmin of 12 volts, when the difference between the current Vacs and Vtarget is large, controller 160 establishes a new Vacs that jumps 80% of the difference between the current Vacs and Vtarget. Thus if the current Vacs is 12 volts and Vtarget is 20 volts, controller 160 will output an attenuation control signal to produce a new Vacs of 18.4 volts. In contrast, when the difference between the current Vacs and Vtarget is small, controller 160 establishes a new Vacs that jumps only 20% of the difference between the current Vacs and Vtarget. Thus if the current Vacs is 19 volts and Vtarget is 20 volts, controller 160 will output an attenuation control signal to produce a new Vacs of 19.2 volts. In one embodiment, calculation of the new Vacs (New_Vacs) is more generally described by Equation 1, $$\text{New\_Vacs} = \left[ (\text{Max\_jump} - \text{Min\_jump}) \times \left( \frac{|Vacs - Vtarget|}{V\max - V\min} \right) + \text{Min\_jump} \right] \times (Vtarget - Vacs) + Vacs \quad \text{Equation 1}$$

where Max_jump is the jump desired when Vtarget is at a maximum distance from the current Vacs (Max_jump=0.80 for the above 80% example), and Min_jump is the jump desired when Vtarget is at a minimum distance from the current Vacs (Min_jump=0.20 for the above 20% example). With this expression, the proportion of the jump, relative to the difference between the Vtarget and Vacs, approaches Max_jump as the ratio of the difference between Vtarget and Vacs to Vmax−Vmin (the usable voltage range) approaches one. Likewise, the proportion of the jump, relative to the difference between the Vtarget and Vacs, approaches Min_jump as the ratio of the difference between Vtarget and Vacs to Vmax—Vmin (the usable voltage range) approaches zero.

Figure 5:
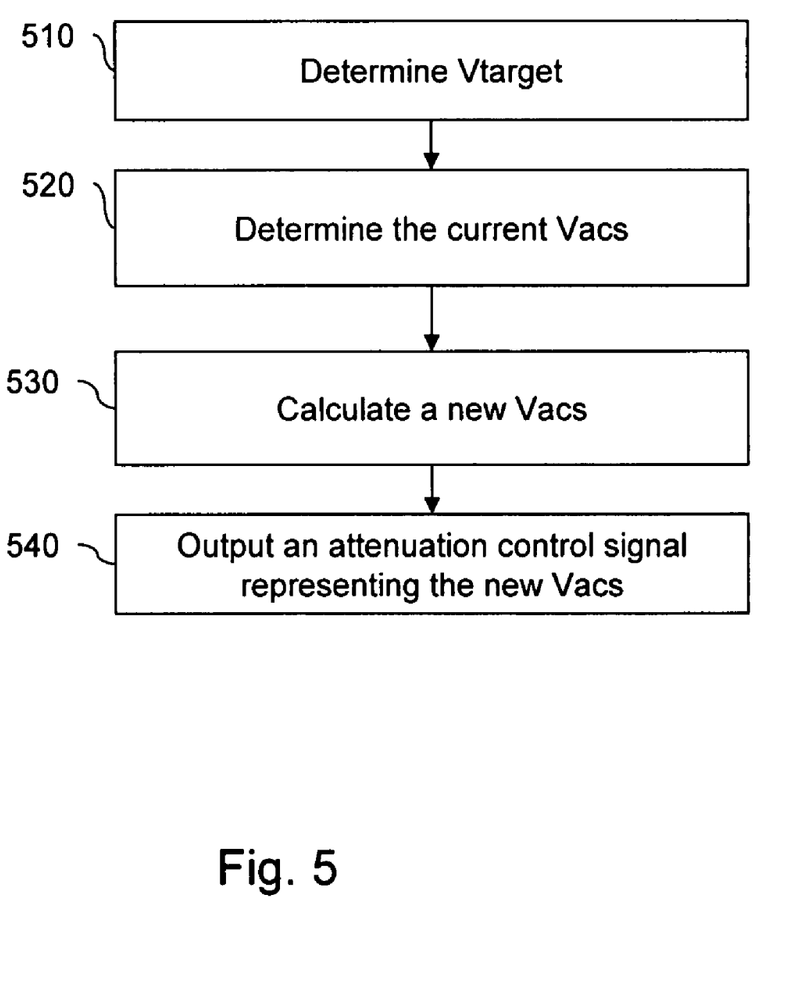
FIG. 5 is a flow chart illustrating a method of one embodiment of the present invention.

FIG. 5 illustrates a method 500 of an algorithm for generating an attenuation control signal implemented by a controller of one embodiment of the present invention. Method 500 begins at 510 with determining Vtarget. In one embodiment, Vtarget is determined based on Popt and Vacs as provided by the method of FIG. 4. Method 500 proceeds to 520 with determining the current Vacs. In one embodiment, the current Vacs is read from an attenuation control signal being applied to an optical power attenuator. Method 500 next proceeds to 530 and comprises calculating New_Vacs based on Equation 1 above, the function, where Max_jump and Min_jump are setpoint constants specifying the jump in Vacs desired when Vtarget is at a respective maximum, or minimum distance from the current Vacs. As would be appreciated by one skilled in the art upon reading this specification, the Max_jump and Min_jump setpoints are readily determined by network operators based on the characteristics of their network and the desired transient response. In one embodiment, Max_jump equals 0.80 and Min_jump equals 0.20. Method 500 then proceeds to 540 and outputs an attenuation control signal representing the value of New_Vacs.

Referring back to FIG. 1, in one embodiment, network 100 further comprises a remote management unit 170 coupled to controller 160 through communication link 172. Remote management unit 170 provides an interface that allows an operator of network 100 to initialize and configure controller 160. In one embodiment, communication link 172 comprises a network adapted to communicate messages between remote management unit 170 and controller 160. In one embodiment, communication link 172 is a serial communications line. In one embodiment, communication link 172 is an IP based network. In one embodiment, communication link 172 is a wireless link. In one embodiment, controller 160 communicates with management module 170 via one or more of, but not limited to, Transaction Language 1 (TL1) network management protocol, Common Management Interface Protocol (CMIP) network management protocol, and Simple Network Management Protocol (SNMP) and sending and receiving ASCII based messages through a command line interface.

In one embodiment in operation, remote management unit 170 allows network operators to alter one or more setpoints in controller 160, such as, but not limited to Pt, Pt_low, Pt_hi, Max_jump and Min_jump, or determine the current values of such setpoints. In one embodiment remote management unit 170 allows network operators to monitor one or more of Popt, Vacs and Vtarget. In one embodiment remote management unit 170 receives an alarm from controller 160 when the attenuation required to maintain Popt within Pt_low and Pt_hi cannot be achieved within the usable range 330 of curve 300 (e.g. when Vtarget>Vmax).

Several means are available to implement the controller of the current invention. These means include, but are not limited to, digital computer systems, programmable controllers, or field programmable gate arrays. Therefore other embodiments of the present invention include program instructions resident on computer readable media that when implemented by such controllers, enable the controllers to implement embodiments of the present invention. Computer readable media include any form of computer memory, including but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for controlling optical power in an optical communications network, the method comprising:
    periodically measuring an optical power of an optical signal received by an optical receiver;
    periodically measuring a first attenuation control signal voltage;
    when the optical power measurement is outside a target power range, calculating a target voltage necessary to maintain the optical power measurements at a target power level;
    calculating a second attenuation control signal based on the target voltage, wherein the second attenuation control signal is calculated to provide an over-damped transient response that maintains the second attenuation control signal within a usable range of a variable optical power attenuator;
    applying the second attenuation control signal voltage based on the second attenuation control signal to the variable optical power attenuator; and
    adjusting attenuation of the optical signal based on the second attenuation control signal voltage.

2. The method of claim 1, further comprising:
    outputting a digital signal based on the second attenuation control signal; and
    converting the digital signal into the second attenuation control signal voltage.

3. The method of claim 1, wherein calculating a target voltage further comprises:
correlating the optical power measurement against an attenuation versus voltage characteristic curve.

4. The method of claim 1, wherein calculating the second attenuation control signal further comprises:
calculating a voltage jump variably proportional to the difference between the target voltage and the first attenuation control signal voltage.

5. The method of claim 4, wherein the proportion of the voltage jump to the difference between the target voltage and the first attenuation control signal voltage approaches a maximum jump setpoint as the ratio of the difference between the target voltage and the first attenuation control signal voltage to a usable voltage range approaches one.

6. The method of claim 4, wherein the proportion of the voltage jump to the difference between the target voltage and the first attenuation control signal voltage approaches a minimum jump setpoint as the ratio of the difference between the target voltage and the first attenuation control signal voltage to a usable voltage range approaches zero.

7. The method of claim 1 further comprising:
receiving one or more reconfiguration messages from a management unit; and
altering one or more of set points based on the reconfiguration messages.

8. The method of claim 7 further comprising:
receiving one or more query messages from the management unit; and
communicating to the management unit one or more of the target voltage, the first attenuation control signal voltage and the measured optical power.

9. The method of claim 1 further comprising:
communicating an alarm to a management unit when the target voltage necessary to maintain the optical power measurements at a target power level is outside a usable voltage range of an attenuation versus voltage characteristic curve.

10. A computer-readable storage device having program instructions for execution by a computer for a method for controlling optical power in an optical communications network, the method comprising:
periodically measuring an optical power of an optical signal received by an optical receiver;
periodically measuring a first attenuation control signal voltage;
when the optical power measurement is outside a target power range, calculating a target voltage necessary to maintain the optical power measurements at a target power level;
calculating a second attenuation control signal based on the target voltage, wherein the second attenuation control signal is calculated to provide an over-damped transient response that maintains the second attenuation control signal within a usable range of a variable optical power attenuator;
applying a second attenuation control signal voltage based on the second attenuation control signal to the variable optical power attenuator; and
adjusting attenuation of the optical signal based on the second attenuation control signal voltage.

11. The method of claim 10, wherein calculating a target voltage further comprises:
correlating the optical power measurement against an attenuation versus voltage characteristic curve.

12. The method of claim 10, wherein calculating the second attenuation control signal further comprises:
calculating a voltage jump variably proportional to the difference between the target voltage and the first attenuation control signal voltage.

13. The method of claim 12, wherein the proportion of the voltage jump to the difference between the target voltage and the first attenuation control signal voltage approaches a maximum jump setpoint as the ratio of the difference between the target voltage and the first attenuation control signal voltage to a usable voltage range approaches one.

14. The method of claim 12, wherein the proportion of the voltage jump to the difference between the target voltage and the first attenuation control signal voltage approaches a minimum jump setpoint as the ratio of the difference between the target voltage and the first attenuation control signal voltage to a usable voltage range approaches zero.

15. The method of claim 10 further comprising:
receiving one or more reconfiguration messages from a management unit; and
altering one or more of set points based on the reconfiguration messages.

16. The method of claim 15 further comprising:
receiving one or more query messages from the management unit; and
communicating to the management unit one or more of the target voltage, the first attenuation control signal voltage and the measured optical power.

17. The method of claim 10 further comprising:
communicating an alarm to a management unit when the target voltage necessary to maintain the optical power measurements at a target power level is outside a usable voltage range of an attenuation versus voltage characteristic curve.

18. A feedback system for controlling optical power levels, the system comprising:
an optical receiver that receives a modulated optical light signal, demodulates the modulated optical light signal into one or more communications signals, and outputs the one or more communications signals to a communications network;
wherein the optical receiver further measures an optical power level of the received optical light signal and outputs a power level signal representing the optical power level;
at least one optical power attenuator that dynamically adjusts the attenuation of the modulated optical light signal based on a control signal; and
a controller coupled to the optical receiver, wherein the controller receives the power level signal from the optical receiver, wherein when the optical power level is outside a target power range, the controller calculates a target voltage necessary to maintain the optical power level at a target power level and outputs the control signal based on the target voltage, wherein the control signal is calculated to provide an over-damped transient response that maintains the control signal within a usable range of the optical power attenuator, wherein the control signal is a digital signal;
a digital to analog converter that converts the control signal into an analog voltage signal;
wherein the at least one optical power attenuator is adapted to attenuate the modulated optical light signal based on the analog voltage signal;
wherein the controller periodically measures an attenuation control signal voltage applied to the optical power attenuator and further calculates a voltage jump variably proportional to the difference between the target voltage and the attenuation control signal voltage.

19. The system of claim 18, wherein the proportion of the voltage jump to the difference between the target voltage and the first attenuation control signal voltage approaches a maximum jump setpoint as the ratio of the difference between the target voltage and the first attenuation control signal voltage to a usable voltage range approaches one.

20. The system of claim 18, wherein the proportion of the voltage jump to the difference between the target voltage and the first attenuation control signal voltage approaches a minimum jump setpoint as the ratio of the difference between the target voltage and the first attenuation control signal voltage to a usable voltage range approaches zero.

21. The system of claim 18 further comprising:
a management unit coupled to the controller, wherein the management unit communicates with the controller, wherein the controller receives reconfiguration messages from the management unit and alters one or more set points based on the reconfiguration messages; and
wherein the controller further receives query messages from the management unit and communicates to the management unit one or more of the target voltage, the control signal voltage and the measured optical power.

22. The system of claim 21, wherein the controller communicates one or more alarms to the management unit when the target voltage necessary to maintain the optical power measurements at a target power level is outside a usable voltage range of an attenuation versus voltage characteristic curve.

23. The system of claim 21, wherein the management unit and controller communicate together by sending and receiving messages with one or more of the Transaction Language 1 network management protocol, the Common Management Interface Protocol, the Common Management Interface, the Simple Network Management Protocol, and ASCII based messages through a command line interface.

24. A method for controlling optical power in an optical communications network, the method comprising:
modulating optical signals with one or more radio frequency communication signals received from a first communications network segment;
launching the modulated optical signal on one or more optical media;
receiving the modulated optical signal at an optical receiver;
periodically measuring an optical power of an optical signal received by an optical receiver;
generating an attenuation control signal based on the measured optical power, wherein the attenuation control signal provides an over-damped transient response that maintains the attenuation control signal within a usable range of a variable optical power attenuator; and
adjusting attenuation of the modulated optical signal based on the attenuation control signal;
wherein generating an attenuation control signal further comprises:
periodically measuring a first attenuation control signal voltage;
when the optical power measurement is outside a target power range, calculating a target voltage necessary to maintain the optical power measurements at a target power level;
calculating the attenuation control signal based on the target voltage; and
transmitting a second attenuation control signal voltage to the variable optical power attenuator based on the attenuation control signal.

25. The method of claim 24, wherein calculating a target voltage further comprises:
correlating the optical power measurement against an attenuation versus voltage characteristic curve.

26. The method of claim 24, wherein calculating the attenuation control signal further comprises:
calculating a voltage jump variably proportional to the difference between the target voltage and the first attenuation control signal voltage.

27. The method of claim 26, wherein the proportion of the voltage jump to the difference between the target voltage and the first attenuation control signal voltage approaches a maximum jump setpoint as the ratio of the difference between the target voltage and the first attenuation control signal voltage to a usable voltage range approaches one.

28. The method of claim 26, wherein the proportion of the voltage jump to the difference between the target voltage and the first attenuation control signal voltage approaches a minimum jump setpoint as the ratio of the difference between the target voltage and the first attenuation control signal voltage to a usable voltage range approaches zero.

29. A system for controlling optical power levels in a communications network, the system comprising:
means for demodulating one or more radio frequency communications signals from an modulated optical signal;
means for variably attenuating the modulated optical signal based on a attenuation control signal voltage;
means for periodically measuring an optical power of the modulated optical signal received by the means for demodulating;
means for periodically measuring the attenuation control signal voltage;
means for calculating a target voltage necessary to maintain the optical power measurements at a target power level based on an attenuation versus voltage characteristic curve for the means for variably attenuating;
means for calculating an adjustment to the attenuation control signal voltage based on the target voltage, wherein the adjustment to the attenuation control signal voltage is calculated to provide an over-damped transient response that maintains the attenuation control signal voltage within a usable range of the means for variably attenuating;
means for applying an adjusted attenuation control signal voltage the means for variably attenuating;
wherein calculating an adjustment to the attenuation control signal voltage comprises calculating a voltage jump variably proportional to the difference between the target voltage and the attenuation control signal voltage.

30. The system of claim 29, wherein the proportion of the voltage jump to the difference between the target voltage and the first attenuation control signal voltage approaches a maximum jump setpoint as the ratio of the difference between the target voltage and the attenuation control signal voltage to a usable voltage range approaches one.

31. The system of claim 29, wherein the proportion of the voltage jump to the difference between the target voltage and the first attenuation control signal voltage approaches a minimum jump setpoint as the ratio of the difference between the target voltage and the attenuation control signal voltage to a usable voltage range approaches zero.

* * * * *